(12) United States Patent
Sugiyama (10) Patent No.: US 6,600,545 B1
(45) Date of Patent: Jul. 29, 2003

(54) TWIST-NEMATIC LIQUID-CRYSTAL DISPLAY WITH ELECTRODES SURROUNDED BY BACKGROUND

(75) Inventor: Takashi Sugiyama, Hadano (JP)

(73) Assignee: Stanley Electric Co., Ltd., Tokyo (JP)

( * ) Notice: Subject to any disclaimer, the term of this patent is extended or adjusted under 35 U.S.C. 154(b) by 88 days.

(21) Appl. No.: 09/709,152

(22) Filed: Nov. 10, 2000

(30) Foreign Application Priority Data

Nov. 22, 1999 (JP) ............................................ 11-331500

(51) Int. Cl.[7] ....................... C09K 19/02; G02F 1/1347; G02F 1/1333; G09G 3/18
(52) U.S. Cl. ...................... 349/186; 349/81; 349/84; 349/177; 349/76; 345/38
(58) Field of Search ................................ 349/177, 186, 349/96, 76, 81, 84; 345/38, 90

(56) References Cited

U.S. PATENT DOCUMENTS 4,527,864 A    7/1985   Dir ............................ 350/337

FOREIGN PATENT DOCUMENTS

| EP | 0 637 773 A1 | 2/1995 |
|---|---|---|
| JP | 59-17537 | * 1/1984 |
| JP | 01-216318 | 8/1989 |
| JP | 02-125224 | 5/1990 |
| JP | 03-258480 | 11/1991 |
| JP | 08-292434 | 11/1996 |

OTHER PUBLICATIONS

Patent Abstracts of Japan, vol. 1998, No. 09, Jul. 31, 1998 (Jul. 31, 1998) and JP 10–090644 A (Matsushita Electric Ind. Co. Ltd.), Apr. 10, 1998 (Apr. 10, 1998) –Abstract only.

* cited by examiner

Primary Examiner—Tarifur R. Chowdhury
(74) Attorney, Agent, or Firm—Frishauf, Holtz, Goodman & Chick, P.C.

(57) ABSTRACT

A twist-nematic liquid crystal display includes a first substrate and a second substrate disposed to oppose to the first substrate with distance d1 therebetween, either one of the first and second substrates being a transparent substrate; a plurality of pixel electrodes formed on either one of a surface of the first substrate and a surface of the second substrate, said surfaces opposing to each other; a common electrode formed on other one of the surfaces respectively of the first and second substrates, a voltage applying unit for applying a voltage between the pixel electrodes and the common electrode, twist-nematic liquid crystal sandwiched between the first and second substrates, molecules of the liquid crystal respectively having long axes continuously twisted between the first and second substrates. When the twist-nematic liquid crystal has a birefringence index (retardation) of $\Delta n$, $\Delta n \times d_1 > 2$ $\mu$m is satisfied, where $d_1$ is expressed in micrometers. This provides a liquid crystal display in which transmittivity in a base section in which pixel electrodes are not disposed is almost equal to transmittivity in a non-selected section in which pixel electrodes are disposed.

2 Claims, 10 Drawing Sheets

TWIST-NEMATIC LIQUID-CRYSTAL DISPLAY WITH ELECTRODES SURROUNDED BY BACKGROUND

This application is based on Japanese Patent Application Hei 11-331500 filed on Nov. 22, 1999, the entire contents of which are incorporated herein by reference.

BACKGROUND OF THE INVENTION

1. Field of the Invention

The present invention relates to a twist-nematic (TN) liquid crystal display, and in particular, to a twisted-nematic liquid crystal display of which display quality is improved as compared with the prior art.

In a nematic state of liquid crystal, liquid crystal molecules linearly elongated in a rod-like shape have optical axes aligned in one direction or orientation.

In a twist-nematic state of liquid crystal, all liquid crystal molecules sandwiched between two substrate surfaces are aligned in parallel with the substrate surfaces, but their orientation is 90° twisted between both substrate surfaces. Therefore, the orientation of alignment of liquid crystal molecules are continuously changed by a total of 90° between the substrate surfaces.

2. Description of the Related Art

Figure 5A:
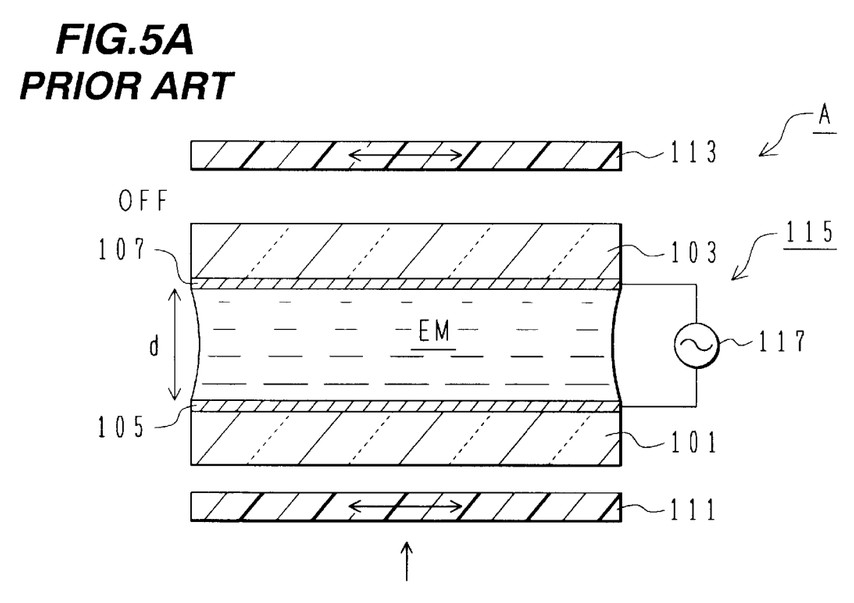
FIGS. 5A and 5B are diagrams showing a principle of a liquid crystal display of twist nematic type in which (A) shows a state in which no voltage is applied to electrodes and (B) shows a state in which a voltage is applied to electrodes.
Figure 5B:
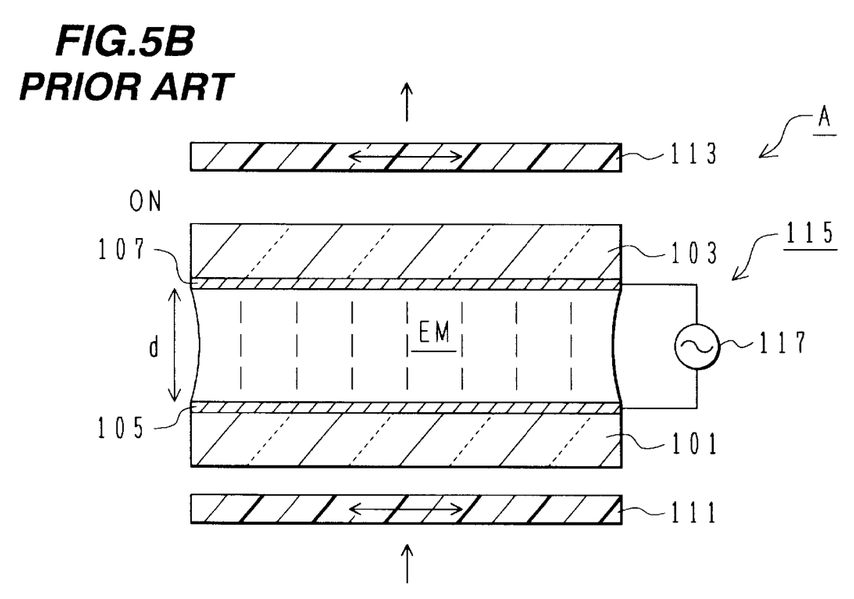

FIG. 5(A) and FIG. 5(B) show schematic configurations of a twist-nematic liquid crystal display.

As can be seen in FIG. 5(A), a twist-nematic liquid crystal display A includes two glass substrate 101 and 103 which are arranged to each other and apart from each other by predetermined distance d and which are opposing to each other, two transparent electrodes 105 and 107 formed on inner surfaces respective of the glass substrates 101 and 103, nematic liquid crystal EM (to be represented as Np liquid crystal herebelow) which is sandwiched between two glass substrates and which is positive in dielectric anisotropy, and a pair of polarizing plates 111 and 113 disposed outside the glass substrates 101 and 103, respectively.

Two glass substrates 101 and 103, tow transparent electrodes 105 and 107, and molecules of the nematic liquid crystal EM form pixels 115. The transparent electrode 105 is a pixel electrode of segment type and the transparent electrode 107 is a shared or common electrode. The system further includes a voltage source 117 to apply a desired voltage between the transparent electrodes 105 and 107. The system includes a plurality of transparent pixel electrodes 105. FIG. 5(a) shows a state in which no voltage is applied between the transparent electrodes 105 and 107.

A large number of molecules of the nematic liquid crystal EM in the cell 115 has a twist pitch which is sufficiently larger than a wavelength of visible light. When linearly polarized light is vertically incident to the glass substrate 103, the light is polarized 90° (90° polarization) along the twisted state of the molecules of the nematic liquid crystal EM while passing through the cell 115. In the cell 11, when two polarizing plates 111 and 113 have polarizing axes in a parallel Nicols state, namely, when the polarizing axes are parallel to each other, namely, the light is interrupted.

FIG. 5(B) shows a state in which a voltage is applied between the transparent electrodes 105 and 107.

When a predetermined voltage applied to the pixel 115 from the voltage source 117 and the voltage exceeds a threshold voltage Vth, long axes of liquid crystal molecules EM start changing their direction toward a direction of an electric field associated with the voltage.

When the voltage is about twice the threshold voltage Vth, the long axes of liquid crystal molecules in other than the neighborhood of surfaces of the transparent electrodes 105 and 107 are uniformly re-aligned to be parallel to the direction of the electric field and the polarization of 90° is lost. In this state, contrary to the state in which no voltage is applied between the transparent electrodes 105 and 107, light is allowed to pass therethrough in the parallel Nicols state.

In the twist-nematic liquid crystal display A, when the polarizing plates 111 and 113 are arranged in the parallel Nicols state, the liquid crystal display can be operated in a normally black mode.

The liquid crystal molecules EM are sandwiched between two glass substrates 101 and 103 of the display A. To increase contrast between white and black in displayed images, thickness d of the cell of liquid-crystal molecules EM is determined as follows.

When 0 voltage is applied between the transparent electrodes 105 and 107, the pixels of the liquid-crystal display has transimittivity expressed as $$T=\sin^2\{\pi(1+u^2)^{0.5}/2\}/(1+u^2) \tag{3}$$

where, $u=2\Delta nd/\lambda$ and $\Delta n=(n_p-n_1)$.

In expression (3), $\lambda$ is a wavelength of the incident light and $n_p$ is a refractive index of liquid crystal molecules in an axial direction parallel to the long axis of the liquid crystal molecules, and $N_l$ is a refractive index of the liquid crystal molecules in an axial direction vertical to the long axis of the liquid crystal molecules. By determining the value of d for which the transmittivity T of the pixels takes a minimum (minimal) value in expression (3), images can be displayed with a high contrast ratio.

The function of expression (3) is a periodic function. Therefore, the transmittivity takes a plurality of minimal values. Namely, a plurality of values of d exist for the minimal values. Usually, a first or second minimal value of d at a lower order is used in ordinary cases.

In the liquid crystal displays using twist-nematic liquid crystal, images are displayed in primarily two ways, namely, display of segment type and display of matrix type.

The liquid crystal display of the segment type includes a relatively small number of segment-type pixel electrodes and is suitable when a limited number of symbols, numerals, and the like are repetitiously displayed. The liquid crystal displays of segment type are broadly used, for example, for desktop computers (calculators), watches, measuring instruments, computer game machines, and devices to display bar graphs.

In the liquid crystal display of matrix type, a large number of pixel electrodes are arranged, for example, in a contour of a simple matrix. Liquid crystal displays of matrix type are suitably used to display complex images and the like and are employed, for example, for personal computers and television sets.

The liquid-crystal displays are operated by static or multiplex driving.

The static driving is mainly employed when the display includes a small number of pixel electrodes. Each of the pixel electrode of the liquid crystal display receives a voltage individually from a driving circuit (driver). During a display period, the driver continuously applies a display voltage Vs between segment-type pixel electrodes of pixels to be displayed and the common electrode. All segment-type pixel electrodes can be simultaneously driven.

In the liquid-crystal display operated by static driving, 0 volt is applied to segment-type pixel electrodes for a non-display section (not selected for the display operation). Namely, this voltage is the same as that applied to a base section in which no segment-type electrode exists and only a common electrode exsist. The transmittivity and hue in the non-display section are almost the same as those in the base section. Namely, the non-display section and the base section can be readily discriminated from a display section.

The multiplex driving is also called time-division driving or dynamic driving and is used, for example, in a liquid crystal display of segment type including a relatively large number of segment-type pixel electrodes to be displayed. The multiplex driving is also applied to a liquid crystal display of matrix type having a large number of pixel electrodes.

FIGS. 6 and 7A–7C show an example of the multiplex driving in a liquid crystal display.

Figure 6:
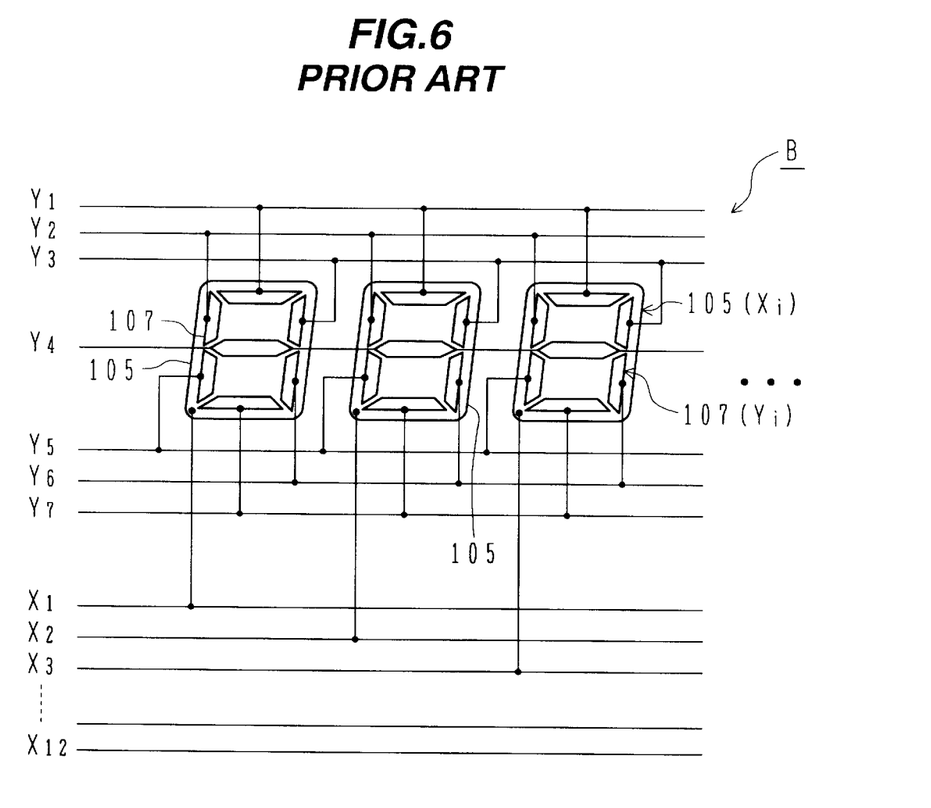
FIG. 6 is a diagram schematically showing a liquid crystal display of twist nematic type.

FIG. 6 shows wiring of a liquid crystal display B in which numerals are displayed at 12 places or positions. Each numeral is displayed with seven segments by multiplex driving. FIG. 6 shows an example in which only three places of numerals are displayed.

For each place, a common electrode 105 is subdivided into 12 sections for place electrodes $X_i$, i.e., $X_1$ to $X_{12}$. All segment-type pixel electrodes 107 are classified into seven groups $Y_i$, i.e., $Y_1$ to $Y_7$. For each group, the electrodes 107 belonging thereto are connected to each other.

At each place, segment-type pixel electrodes (display electrodes) $Y_i$ to be displayed are selectively driven at timing synchronized with timing at which the place electrodes $X_i$ are sequentially driven by time-division driving with a duty factor of 1/12.

The configuration of the liquid crystal display requires 19 driver elements and 19 lead terminals. The number of driver elements and that of lead terminals are remarkably reduced when compared with a case in which the static driving is used.

However, since a large number of pixel electrodes 107 are commonly connected, various divided voltages are applied to the pixel electrodes (non-display electrodes) 107 other than those driven for the display operation. This decreases contrast in displayed images and hence leads to a phenomenon of so-called "crosstalk".

The crosstalk occurs because the liquid crystal equally responds to positive and negative voltages and has a slow electrochemical response (voltage-display contrast) characteristic.

To minimize influence of the crosstalk, a voltage averaging method is employed when the liquid crystal display is driven by multiplex driving.

Figure 7A:
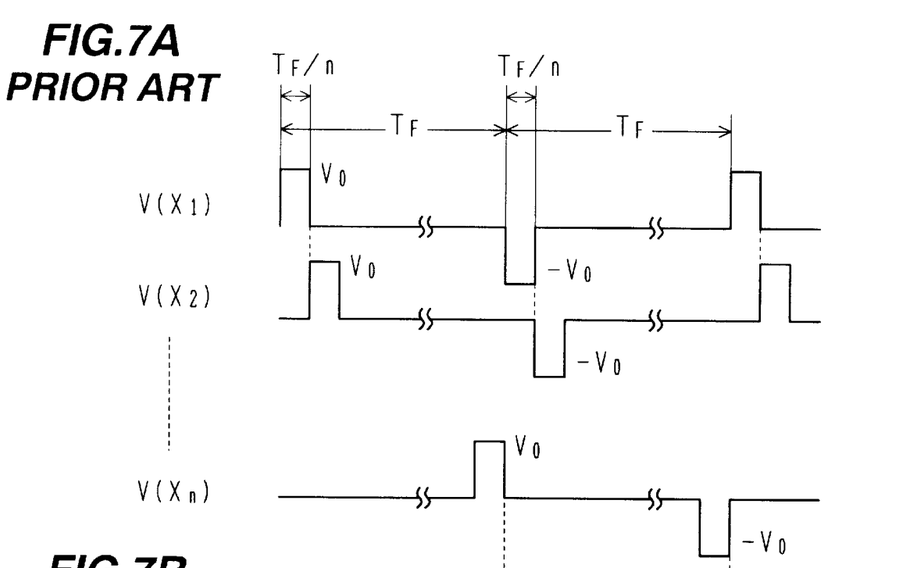
FIGS. 7A–7C are diagrams of timing charts showing driving pulses employed in time-division driving of the liquid crystal display shown in FIG. 6.
Figure 7B:
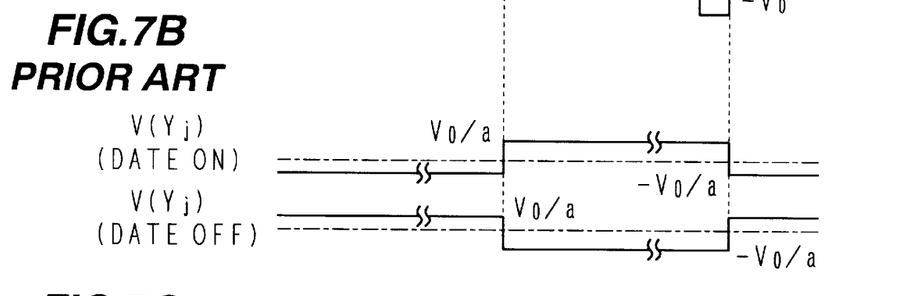
Figure 7C:
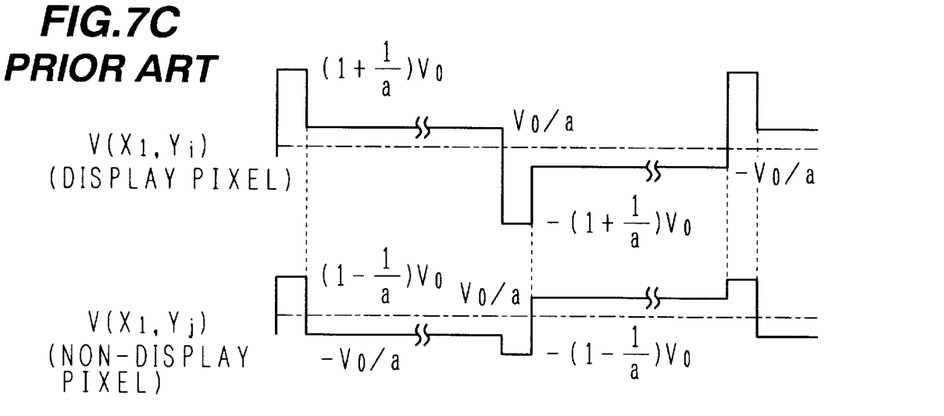

FIGS. 7A–7C show signal timing charts of driving pulse signals in a liquid crystal display operated by n-division driving in a voltage averaging method.

FIG. 7(A) is a signal timing chart showing operation to apply signal voltages $V(X_1)$ to $V(X_n)$ to the common electrodes, i.e., the place electrodes $X_1$ to $X_n$. Assume that one scan period is expressed as $T_F$. A pulse signal of $V_0$ is applied to one place electrode $X_i$ for a period of $T_F/n$.

In one scan period thereafter, a pulse of $-V_0$ is applied thereto.

As can be seen from FIG. 7(B), throughout one scan period, a voltage of $-V_0/a$ and a voltage of $V_0/a$ are applied to the pixel electrode $Y_i$ in a data-on state and in a data-off state, respectively. In a subsequent period, $V_0/a$ and $-V_0/a$ are respectively applied thereto in the data-on and data-off states, respectively.

As shown in FIG. 7(C), when a signal voltage of $\pm V_0$ is applied to the common electrode, the voltage $V(X_i, Y_i)$ applied between the pixel electrode and the common electrode is $\pm(1+1/a)V_0$ with respect to each display electrode and is $\pm(1-1/a)V_0$ with respect to each non-display electrode. When the signal voltage of $\pm V_0$ is not applied to the common electrode, the voltage $V(X_i, Y_i)$ applied between the pixel electrode and the common electrode is $\pm V_0/a$ with respect to each display electrode and is $-(\pm V_0/a)$ with respect to each non-display electrode.

Assume in the voltage averaging method that the scanning pulse and the data input signal pulse are $V_0$ and $V_0/a$ in the time-division driving and the number of scanning electrodes is n. An effective voltage $V_s$ which is an effective voltage applied to a liquid crystal layer of a selected pixel and an effective voltage $V_{ns}$ which is an effective voltage applied to a liquid crystal layer of a non-selected pixel are expressed as follows.

$$V_s = (V_0/a)\{(a^2+2a+n)/n\}^{0.5} \tag{4}$$

$$V_{ns} = (V_0/a)\{(a^2-2a+n)/n\}^{0.5} \tag{5}$$

An optimal value of a in expressions (4) and (5) can be obtained when the display contrast takes a maximum value, namely, when $V_s/V_{ns}$ becomes maximum. The optimal value is obtained as follows.

$$a = n^{0.5} \tag{6}$$

In a normally-black liquid crystal display operated by time-division driving, contrast between pixels is defined as $T_s/T_{ns}$, where $T_s$ is transmittivity of a pixel to which a selection signal is applied and $T_{ns}$ is transmittivity of the pixel to which a non-selection signal is applied.

When the twist-nematic liquid crystal display is operated by time-division driving, a predetermined voltage is applied between the common electrode and the pixel electrodes also in the non-selected state (for the pixels not to be displayed).

Therefore, the transmittivity of the base section differs from that of the section of non-selected pixels (pixels not to be displayed). Namely, these sections vary also in hue from each other.

Since the non-display section and the base section differ in transmittivity and hue from each other, the non-display section cannot be clearly discriminated from the display section depending on cases.

To facilitate discrimination of these sections in the liquid crystal display operated by the time-division driving, it is desired that the transmittivity $T_{ns}$ of the pixel to which a non-selection signal is applied is substantially equal to transmittivity $T_0$ of the pixel in the base section. When $T_s/T_{ns}$ takes a large value and $T_{ns}=T_0$, only a desired display section can be clearly discriminated and hence the liquid crystal display is improved in display quality.

Figure 8:
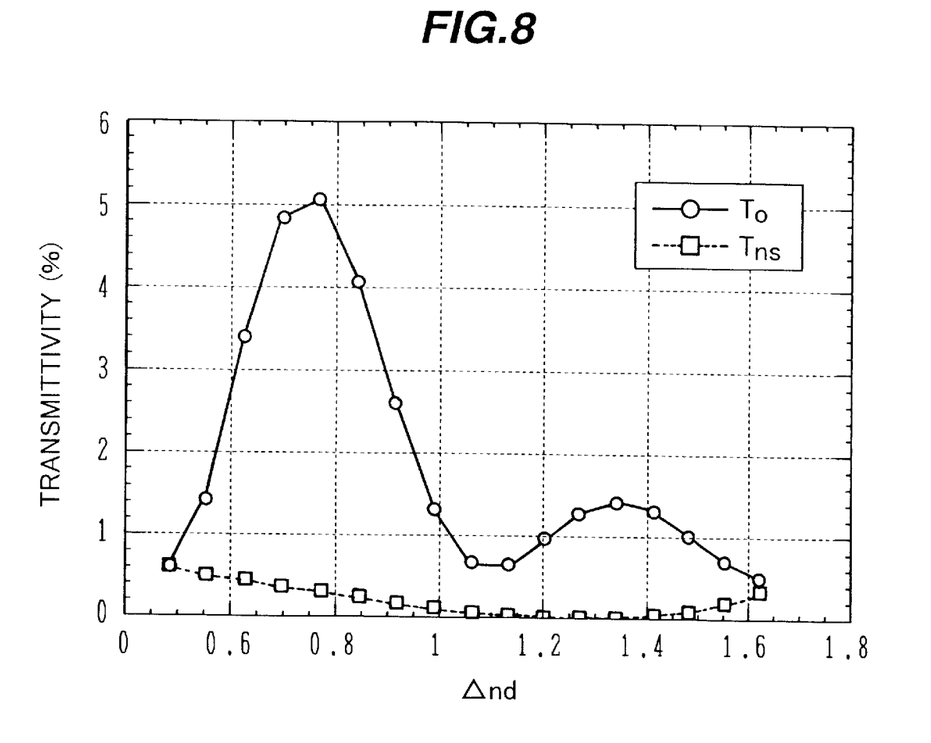
FIG. 8 is a graph showing a Δnd dependence of transmittivity of a liquid crystal display.

FIG. 8 shows dependence of transmittivity T of pixels on retardation $\Delta$nd in a twist-nematic liquid crystal display of the normally black mode in the prior art.

In the graph of FIG. 8, small circles represent a characteristic of transmittivity $T_0$ of pixels in a base section (a section in which the common electrode 105 is visible in FIG. 6). This graph shows transmittivity $T_0$ up to a third minimal value thereof.

Small rectangles represent dependence of transmittivity of non-selection pixels on retardation $\Delta$nd when a non-selection voltage $V_{ns}$ is applied between the pixel electrodes (of segment type) of the pixels and the common electrode 105. As in expression (5), the non-selection voltage $V_{ns}$ is represented by $\pm(V_0/a)\{(a^2-2a+n)/n\}^{0.5}$. The voltage is ordinarily set to a value for which the transmittivity takes a minimum value in the characteristic thereof with respect to the voltage.

The transmittivity $T_0$ of pixels in the base section takes first, second, and third minimal values.

In contrast therewith, the transmittivity $T_{ns}$ of pixels in the non-selection state takes minimal values in a range of $\Delta$nd from 1.2 micrometers ($\mu$m) to 1.3 $\mu$m (a range between the second minimal value to the third minimal value of the transmittivity $T_0$).

Consequently, in the twist-nematic liquid crystal display operated by time-division driving, the contrast ($T_s/T_{ns}$) becomes higher when the retardation $\Delta$nd is set to a minimal value of the transmittivity ($\Delta$nd=1.2 $\mu$m to 1.3 $\mu$m as shown in FIG. 8) not in a state in which the applied voltage is zero but in a state in which the non-selection voltage is applied.

Also in an actual twist-nematic liquid crystal display, the contrast is increased by setting $\Delta$nd to a minimal characteristic value in a state in which the non-selection voltage is applied, for example, to a value in a range 1.2 $\mu$m to 1.3 $\mu$m.

By setting $\Delta$nd to a value in the vicinity of a minimal characteristic value in a state in which the non-selection voltage is applied, the value of $T_{ns}$ is lowered and a high contrast ($T_s/T_{ns}$) is obtained in images displayed by the liquid crystal display.

However, even when the retardation $\Delta$nd is set to a value in the neighborhood of a minimal value of the transmittivity $T_{ns}$, $T_0$ considerably differs from $T_{ns}$.

In a full-dot-matrix liquid crystal display in which pixel electrodes occupy almost the entire display screen area, the base section has quite a small area in many cases. Even when $T_0$ considerably differs from $T_{ns}$, there does not arise any particular problem which hinders easy discrimination between the non-display section and the base section.

However, when the base section occupies a large area as in the liquid crystal display shown in FIG. 6, the considerable difference between $T_0$ and $T_{ns}$, leads to the so-called crosstalk in which not only the section of selected pixels but also the section of pixels not selected are discriminated from the base section. This reduces clarity of images displayed by the liquid crystal display.

Figure 9:
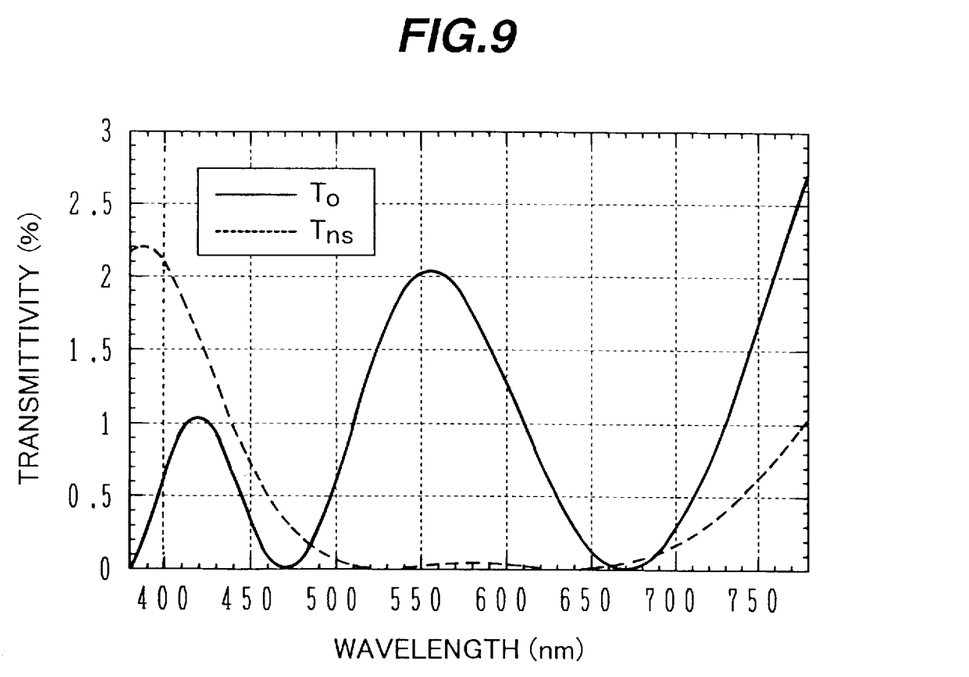
FIG. 9 is a graph showing a wavelength dependence of transmittivity of a liquid crystal display of twist nematic type when viewed from a normal direction of a cell.

FIG. 9 shows a relationship between transmittivity T of pixels and a wavelength of incident light in a liquid crystal display.

In the graph, dependence of the wavelength is compared between the transmittivity $T_0$ and the transmittivity $T_{ns}$ of non-selection pixels.

As can be seen from the graph, the transmittivity $T_0$ has a maximal value for wavelengths of 420 nanometers (nm) and 550 nm and the transmittivity $T_{ns}$ of non-selection pixels has a maximal value for a wavelength of 390 nm. $T_0$ differs from $T_{ns}$ not only in the absolute value but also in the wavelength dependence.

Therefore, the hue remarkably varies in images displayed by the liquid crystal display and the display quality is deteriorated.

The display quality is more reduced when the displayed image is watched from another angle of view.

Figure 10:
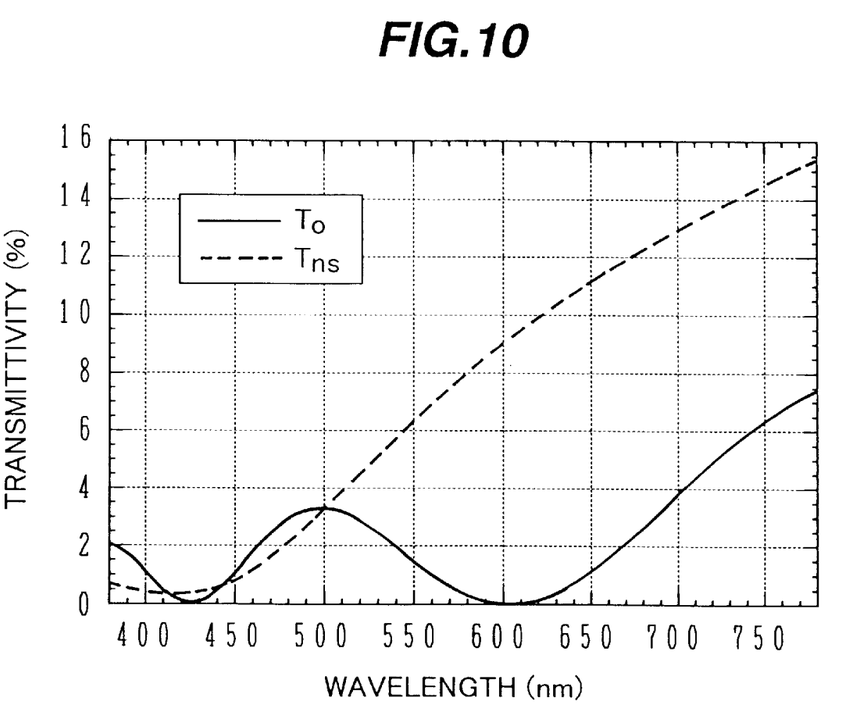
FIG. 10 a graph showing a wavelength dependence of transmittivity of a liquid crystal display of twist nematic type when viewed from a direction inclined 40° from a normal direction of a cell.

The graph of FIG. 10 shows wavelength dependence of the transmittivity T when the liquid crystal display is viewed from an inclined direction. In the graph, the wavelength dependence of the transmittivity $T_0$ is compared with that of the transmittivity $T_{ns}$.

The liquid crystal display is viewed from position at a side thereof when a voltage is applied to the associated electrodes. Specifically, assume that the aligning direction (a direction of long axes) of liquid crystal molecules in a central section of a liquid crystal cell is the direction of 6 o'clock on a dial of a watch. The liquid crystal display is viewed from the direction of 9 o'clock on the dial. Namely, the viewing direction is 40° inclined from a normal of the liquid crystal cell.

The transmittivity $T_0$ has a minimal value for a wavelength of 410 nm and a maximal value for a wavelength of 500 nm. The transmittivity $T_{ns}$ of non-selection pixels has a minimal value for a wavelength of about 390 nm.

Comparison of the spectral characteristic between FIG. 9 and FIG. 10 implies remarkable discrepancy of the absolute value and the wavelength dependence between the transmittivity $T_0$ and the transmittivity $T_{ns}$.

In a wavelength range from 500 nm to 780 nm, the transmittivity $T_{ns}$ of pixels viewed from the inclined direction of FIG. 10 is disadvantageously higher than the transmittivity $T_0$ of pixels viewed from the same direction.

The display characteristic is much more deteriorated when the liquid crystal display is viewed from the incline direction.

SUMMARY OF THE INVENTION

It is therefore an object of the present invention to provide a liquid crystal display in which even when the display is operated by time-division driving, there is obtain a satisfactory display characteristic of high contrast and reduced difference in the transmittivity T and the wavelength dependence (hue) between the base section and the section of non-selection pixels.

Another object of the present invention is to provide a liquid crystal display in which the satisfactory display characteristic can be obtained in a wide viewing angle.

To achieve the objects according to the present invention, there is provided a twist-nematic liquid crystal display including a first substrate and a second substrate disposed to oppose to said first substrate with distance d1 therebetween, either one of said first and second substrates being a transparent substrate; a plurality of pixel electrodes formed on either one of a surface of said first substrate and a surface of said second substrate, said surfaces opposing to each other; a common electrode formed on other one of said surfaces respectively of said first and second substrates; voltage applying means for applying a voltage between said pixel electrodes and said common electrode; twist-nematic liquid crystal sandwiched between said first and second substrates, molecules of said liquid crystal respectively having long axes continuously twisted between said first and second substrates. When said twist-nematic liquid crystal has a birefringence index (retardation) of $\Delta$n, expression $\Delta n \times d_1 > 2$ $\mu$m is satisfied, where $d_1$ is expressed in micrometers.

According to the present invention, there is provided a twist-nematic liquid crystal display including a first substrate and a second substrate disposed to oppose to said first substrate with distance d2 therebetween, either one of said first and second substrates being a transparent substrate; a plurality of pixel electrodes formed on either one of a surface of said first substrate and a surface of said second substrate, said surfaces opposing to each other; a common electrode formed on other one of said surfaces respectively of said first and second substrates; voltage applying means for applying a voltage between said pixel electrodes and said common electrode; twist-nematic liquid crystal sandwiched between said first and second substrates, molecules of said liquid crystal respectively having long axes continuously twisted between said first and second substrates. When said twist-nematic liquid crystal has a birefringence index (retardation) of $\Delta$n, expression $\Delta n \times d_2 > 2.2$ $\mu$m is satisfied, where $d_1$ is expressed in micrometers.

According to the present invention, there is provided a twist-nematic liquid crystal display including a first substrate and a second substrate disposed to oppose to said first substrate with a distance therebetween, either one of said first and second substrates being a transparent substrate; a plurality of pixel electrodes formed on either one of a surface of said first substrate and a surface of second substrate, said surfaces opposing to each other; a common electrode formed on other one of said surfaces respectively of said first and second substrates; voltage applying means for applying a voltage between said pixel electrodes and said common electrode; twist-nematic liquid crystal sandwiched between said first and second substrates, molecules of said liquid crystal respectively having long axes continuously twisted between said first and second substrates; and a first area in which said pixel electrodes are formed and a second area in which only said common electrode is formed, said second area being in a periphery of said first area. Contrast obtained according to transmittivity of light through said first area and transmittivity of light through said second area is used to display an image. Said voltage applying means applies a selection voltage or a non-selection voltage to said pixel electrodes. The selection voltage and the non-selection voltage are set to values, the values increasing discrepancy between transmittivity of light through said first area when the selection voltage is applied to said pixel electrodes by said voltage applying means and transmittivity of light through said first area when the non-selection voltage is applied to said pixel electrodes by said voltage applying means, the values decreasing discrepancy between transmittivity of light through said first area when the non-selection voltage is applied to said pixel electrodes and transmittivity of light through said second area.

In a liquid crystal display according to the present invention, the contrast ratio takes a value which can be used without causing any problem in practices. The transmittivity of the base section is almost the same as that of the section of non-selected pixels, and substantially a completely black color can be displayed in both sections.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1A:
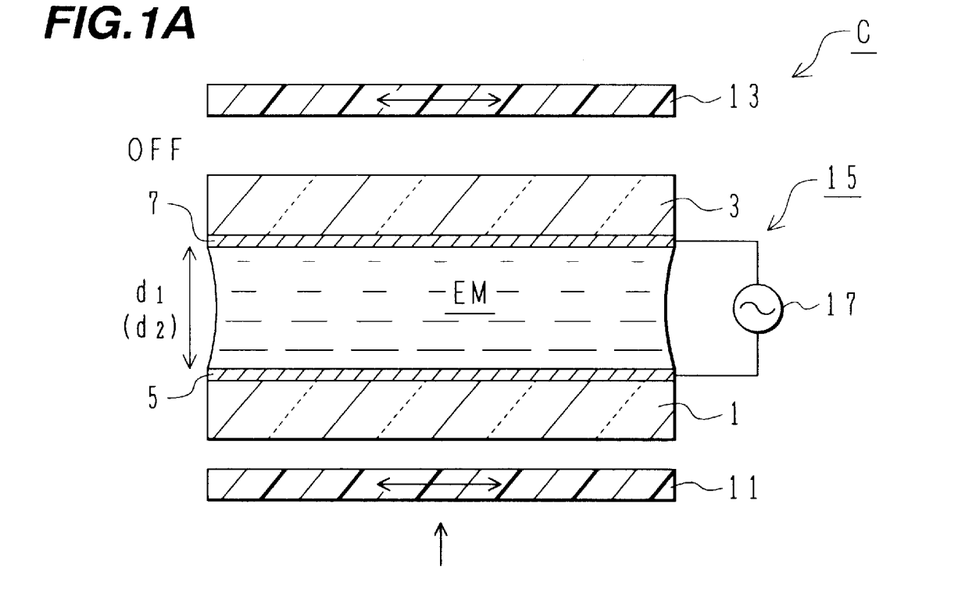
FIGS. 1A and 1B are schematic diagrams showing a principle of an embodiment of a liquid crystal display of twist nematic type according to the present invention in which (A) shows a state in which no voltage is applied to electrodes and (B) shows a state in which a voltage is applied to electrodes.
Figure 1B:
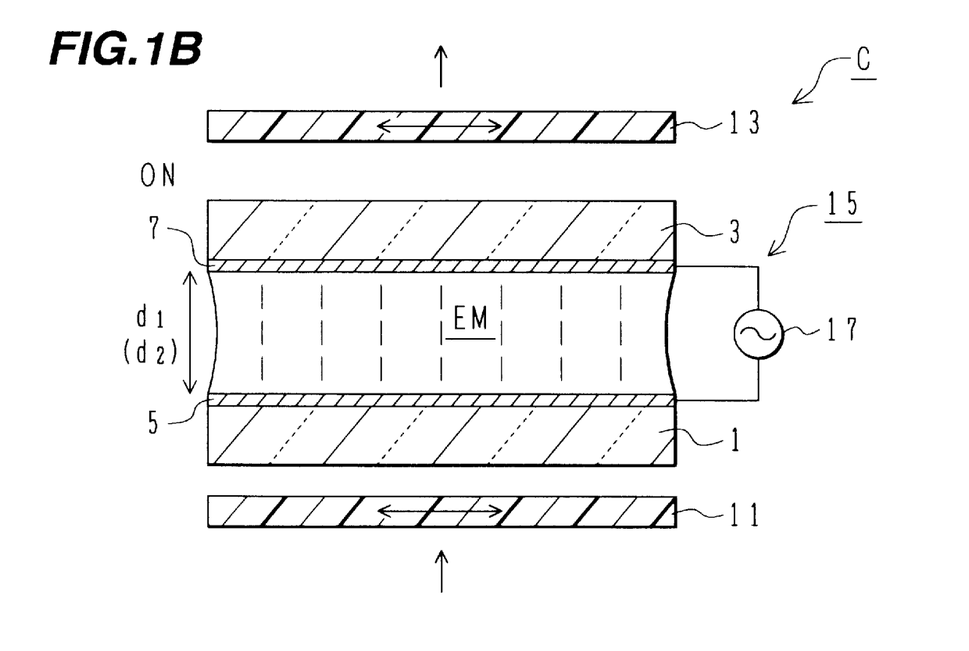

FIGS. 1A and 1B schematically show a configuration of a liquid crystal display of twist nematic type.

As can be seen from FIG. 1(A), a twist-nematic liquid crystal display C includes two glass substrates 1 and 3 which are parallel to each other and are apart from each other by a predetermined distance of $d_1$, transparent electrodes 5 and 7 respectively formed on inner surfaces respectively of the glass substrates 1 and 3, nematic liquid crystal (Np liquid crystal) EM which is sandwiched between the glass substrates 1 and 3, which is twisted by 90° in an off state, and which is positive in dielectric anisotropy; and two polarizing plates 11 and 13 respectively disposed on the outside of each of the glass substrates 1 and 3. Although the polarizing plates 11 and 13 are apart from surfaces of the glass substrates 1 and 3 in FIG. 1(A), the polarizing plates 11 and 13 may be brought into contact with the glass substrates 1 and 3, respectively.

The glass substrates 1 and 3, the transparent electrodes 5 and 7, and the nematic liquid crystal EM constitute pixels 15. Using a voltage source 17, a desired voltage can be developed across the transparent electrodes 5 and 7. The system of FIG. 1(A) is in an off state in which no voltage is applied between the transparent electrodes 5 and 7.

The twist pitch of a large number of nematic liquid crystal molecules EM held in the nematic liquid crystal cell 15 is sufficiently larger than that of a wavelength of visible light. While the linearly polarized light vertically incident to the glass substrate 3 is passing through the nematic liquid crystal molecules EM, the direction of polarization of the light is twisted by 90° (optical rotation of 90°) along the twisted state of the nematic liquid crystal molecules EM. When the polarization axes respectively of the polarizing plates 11 and 13 are parallel to each other (parallel Nicols state), the nematic liquid crystal cell 15 interrupts light.

When the polarization axes respectively of the polarizing plates 11 and 13 are vertical to each other (orthogonal Nicols state), the nematic liquid crystal cell 15 passes light therethrough.

FIG. 1(B) shows a state in which a voltage is applied between the transparent electrodes 5 and 7.

When the voltage source 17 applies a predetermined voltage to a pixel 15 configured as above and the voltage exceeds a threshold voltage Vth, the long axis of liquid crystal molecules in the pixel 15 start changing their directions toward a direction of an associated electric field.

When the applied voltage becomes about twice the threshold voltage Vth, the long axes of liquid crystal molecules in regions other than regions near the surfaces of the transparent electrodes 5 and 7 uniformly re-align to be parallel to the direction of the electric field. The optical rotation of 90° is therefore lost. In contrary to a case in which no voltage is applied between the transparent electrodes 5 and 7, light passes through the cell 15 in the parallel Nicols state. The light is interrupted in the orthogonal Nicols state.

When the polarizing plates 11 and 13 are placed in the parallel Nicols state as in the twist-nematic liquid crystal display C, the display can operate in a normally black display mode.

The transparent electrode 5 is a pixel electrode. A plurality of pixel electrodes 5 are formed on the glass substrate 1. The transparent electrode 7 is a common electrode. Assume that an area in which the pixel electrodes 5 are formed is a first-area and an area in which only the common electrode 7 are formed is a second area.

Figure 2:
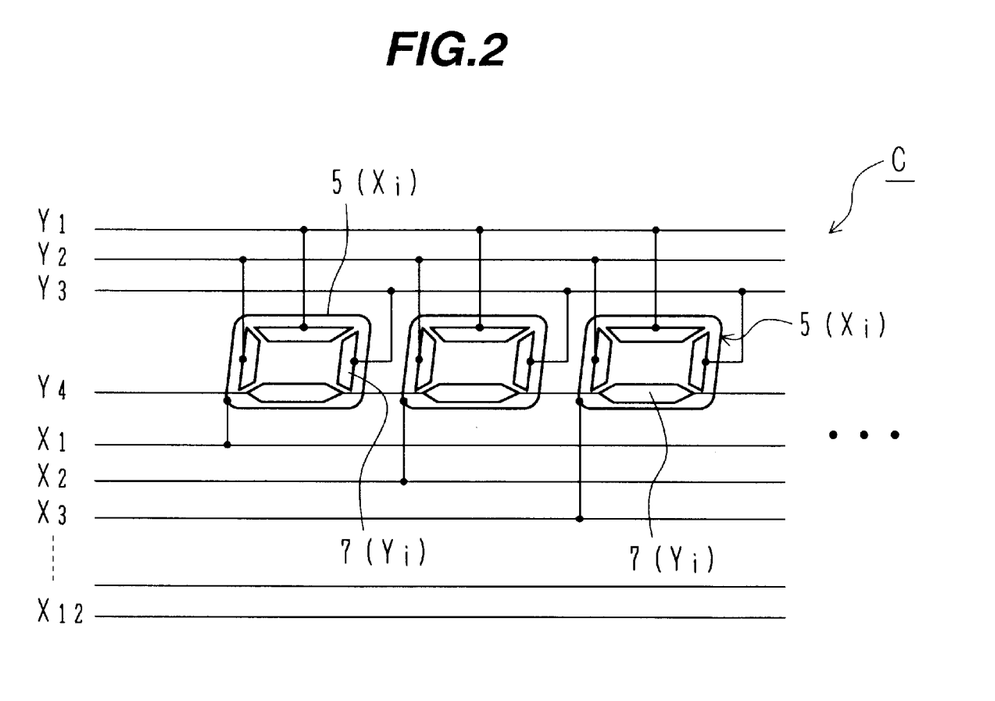
FIG. 2 is a plan view schematically showing an embodiment of a liquid crystal display of twist nematic type according to the present invention.

FIG. 2 shows an example of multiplex driving operation of the liquid crystal display C.

In FIG. 2 showing the liquid crystal display C in a schematic plan view, 12-place symbols are operated by multiplex driving. For each symbol, four-segment pixel electrodes are disposed.

The common electrode 5 is divided into 12 partitions, i.e., $X_1$ to $X_{12}$ for the symbol places. All segment electrodes 7 are classified into four groups $Y_i$, i.e., $Y_1$ to $Y_4$. For each group, the electrodes belonging to the pertinent group are connected to each other.

At timing synchronized with timing to drive the place electrodes Xi with a duty factor of 1/12 by time-division driving, segment-type pixel electrodes $Y_i$ to be displayed are selectively driven for each place.

The number of segment-type pixel electrodes is not limited to four.

In the configuration of the liquid crystal display C, dependence of transmittivity T on the retardation Δnd having a larger value (up to Δnd=2.75) has been examined by experiments.

Figure 3:
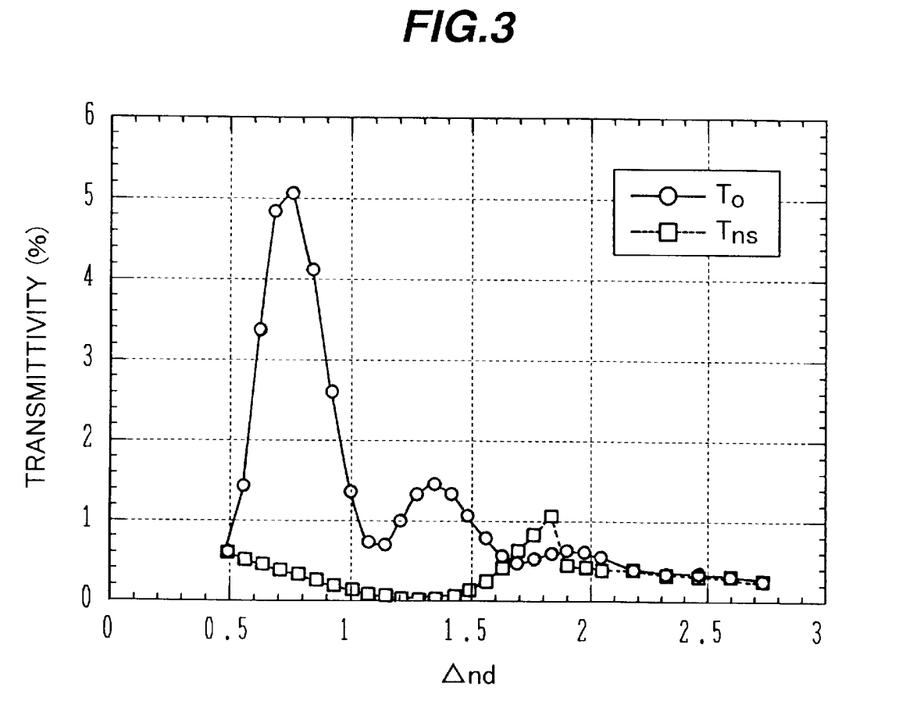
FIG. 3 is a graph showing a Δnd dependence of transmittivity of the liquid crystal display shown in FIG. 2.

FIG. 3 shows the results of the experiments in a graph, namely, the dependence of transmittivity T on Δnd for pixels of the liquid crystal display C.

Like in the graph of FIG. 8, the transmittivity Tns of pixels to which a non-selection voltage is applied takes a minimal value when Δnd is 1.2 μm and 1.3 μm. When Δnd is further increased, the transmittivity $T_{ns}$ becomes greater. Consequently, when Δnd is increased, the contrast which is a ratio of the transmittivity $T_s$ to the transmittivity $T_{ns}$ becomes smaller. The results of experiments support the commonly known event that a satisfactory image cannot be displayed when Δnd becomes greater.

However, through experiments using a liquid crystal display with a larger value of Δnd, the transmittivity T has been obtained as follows. Results of the experiments will be next described.

In a range of Δnd from 1.8 μm to 1.9 μm, the transmittivity $T_{ns}$ of non-selection pixels abruptly becomes smaller. In a range in which Δnd is equal to or more than 1.9 μm, the transmittivity $T_{ns}$ of non-selection pixels gradually becomes smaller when Δnd becomes greater. When Δnd is equal to or more than 2.2 μm, the transmittivity $T_0$ of the base section becomes substantially equal to the transmittivity $T_{ns}$ of the section of non-selection pixels.

Figure 4:
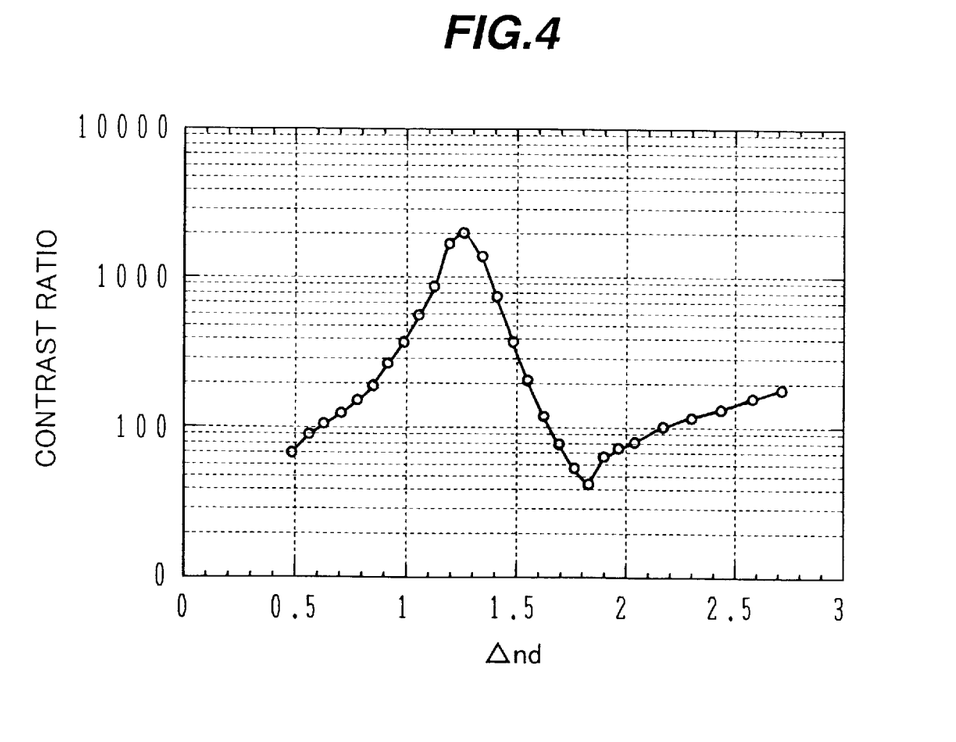
FIG. 4 is a graph showing a Δnd dependence of a contrast ratio of the liquid crystal display shown in FIG. 2.

FIG. 4 shows dependence of the contrast ratio ($T_s/T_{ns}$) of pixels on Δnd when the liquid crystal display is driven with a duty factor of ¼ (four scanning operations per period).

In a range of Δnd from 1.2 μm to 1.3 μm, the contrast ratio takes a maximum value of about 2000. In a range of Δnd from 1.2 μm to 1.8 μm, the contrast ratio abruptly becomes smaller as Δnd increases. When Δnd is 1.9 μm or more, the contrast ratio increases as Δnd becomes greater.

When Δnd is about 2.2 μm, the contrast ratio exceeds 100. When Δnd becomes about 2.7 μm, the contrast ratio is about 200. Although this value is smaller than the maximum value of 2000, the value of about 200 is applicable to practices. When the contrast ratio is 100 or more, there arises substantially no problem in practices.

When Δnd is 2 μm or more, the transmittivity $T_0$ of a pixel to which 0 volt is applied is almost equal to the transmittivity $T_{ns}$ of a non-selection pixel. The transmittivity T itself also takes a low value of about 0.4%.

Therefore, the base section and the section of the non-selected pixels equally perceived by the viewer. Since almost completely neutral black is displayed in both sections, the liquid crystal display can display images with remarkably high display quality.

The results imply that it is only necessary that the value of Δnd ranges from 1.9 μm to 2.7 μm; favorably, from 2.0 μm to 2.7 μm, and more favorably from 2.2 μm to 2.7 μm. The present invention is also applicable to liquid crystal displays of which Δnd is 2.7 μm or more. However, when thickness d of the liquid crystal cell is excessively large, the response speed of the cell is lowered. Therefore, it is favorable to employ liquid crystal of which Δn has a large value.

For a pixel of which Δnd is from 1.2 μm to 1.3 μm, the contrast ratio is actually increased, and the neutral black is displayed when the non-selection voltage is applied thereto. However, the base section is greenish and the transmittivity $T_0$ is increased. Therefore, the section of non-selection pixels appears as the so-called crosstalk and the display quality is deteriorated.

The tendency of the deterioration in display quality becomes remarkable when the viewing angle is changed as described above.

Description will now be given of comparative examples and an embodiment of a liquid crystal display according to the present invention.

Comparative Example 1

1) Substrate: Glass substrate with transparent electrodes.
2) Alignment film: SE-150 of Nissan Chemical Industries, Ltd.; Pre-tilt angle of 2°.
3) Rubbing: With rubbing cloth of rayon.
4) Direction of alignment: 90° between alignment directions of upper and lower substrates.
5) Cell thickness: 7.1 μm.
6) Liquid crystal: Liquid crystal of Merck (Δn=0.15) to which 0.1 wt % chiral agent (S-811 of Merck) is added (counterclockwise twist).
7) Δnd of cell: 1.065 μm.

Comparative Example 2

1) Substrate: Glass substrate with transparent electrodes.
2) Alignment film: SE-150 of Nissan Chemical Industries, Ltd.; Pre-tilt angle of 2°.
3) Rubbing: With rubbing cloth of rayon.
4) Direction of alignment: 90° between alignment directions of upper and lower substrates.
5) Cell thickness: 8.3 μm.
6) Liquid crystal: Liquid crystal of Merck (Δn=0.15) to which 0.1 wt % chiral agent (S-811 of Merck) is added (counterclockwise twist).
7) Δnd of cell: 1.245 μm.

Embodiment 1

1) Substrate: Glass substrate with transparent electrodes.
2) Alignment film: SE-150 of Nissan Chemical Industries, Ltd.; Pre-tilt angle of 2°.

3) Rubbing: With rubbing cloth of rayon.
4) Direction of alignment: 90° between alignment directions of upper and lower substrates.
5) Cell thickness: 11.7 µm.
6) Liquid crystal: Liquid crystal of Melk ($\Delta n=0.21$) to which 0.1 wt % chiral agent (S-811 of Melk) is added (counterclockwise twist).
7) $\Delta nd$ of cell: 2.457 µm.

Description will now be given of results of evaluation of the contrast ratios (measured at a position existing on a normal of the cell).

For data of the liquid crystal display operated by static driving, the ratio between transmittivity values respectively of a base section and a pixel section is measured in a case in which 5 V is applied to the pixel electrode and in a case in which 0 V is applied thereto.

In the time-division driving, the ratio between the on transmittivity to the off transmittivity is measured by applying driving waveform with a bias of ⅓ and a duty factor of ¼. The driving voltage is set to obtain the maximum contrast ratio under the condition.

The polarizing plates used for the measurement are G-1220 of Nitto Electric Industrial Co., Ltd. In the measurement, the plates are arranged in the parallel Nicols state, and the lower substrate has an alignment direction parallel to a direction of a transmission axis of the lower polarizing plate.

Description will now be given of results of measurement of contrast ratios in the static driving and in the time-division driving of comparative examples 1 and 2 and embodiment 1.

The contrast ratio in the static driving is obtained as 56 for pixels of comparative example 1, 47 for pixels of comparative example 2, and 114 for pixels of embodiment 1.

The contrast ratio in the time-division driving is obtained as 94 for pixels of comparative example 1, 250 for pixels of comparative example 2, and 119 for pixels of embodiment 1.

As can be seen from the results, the contrast ratio in the static driving takes the highest value for pixels of embodiment 1, and the contrast ratio in the time-division driving takes the highest value for pixels of comparative example 2.

Pixels of comparative example 2 seem to be advantageous because of the highest contrast ratio in the time-division driving. However, there actually exists considerable discrepancy between the contrast ratio of pixels in the static driving and that of pixels in the time-division driving. In the static driving, the voltage applied to the pixels not selected is 0 V. This is equal to the voltage applied to the base section. However, in the time-division driving, the voltage applied to the base section differs from that applied to pixels not selected, which leads to discrepancy in the contrast ratios. Therefore, in the time-division driving of pixels of comparative example 2, the crosstalk takes place.

For the pixels of embodiment 1, the contrast ratio of pixels in the static driving is almost equal to that of pixels in the time-division driving. Therefore, the crosstalk rarely occurs.

Consequently, the pixels of embodiment 1 in which influence of crosstalk is minimized and the contrast ratio is increased are superior to those of comparative examples 1 and 2.

Description will now be given of results obtained by visually evaluating pixels of comparative examples 1 and 2 and embodiment 1.

When pixels of comparative example 1 are viewed from a position on a normal thereto, the base section seems to be considerably colored. When the viewing angle is changed, the base section and the non-selection section remarkably change in hue. The display quality is therefore deteriorated.

When pixels of comparative example 2 are viewed from a position on a normal thereto, crosstalk clearly takes place due to the difference in transmittivity between the base section and the non-selection section. The base section is less colored as compared with pixels of comparative example 1, but is still conspicuous. When the viewing angle is changed, the base section and the non-selection section also remarkably change in hue. The display quality is therefore deteriorated.

In embodiment 1, when pixels thereof are viewed from a position on a normal thereto, the transmittivity of pixels to which a selection voltage is applied is slightly low. However, a section of pixels to which a non-selection voltage is applied and a base section have hue of neutral black. Transmittivity and hue of the non-selection section are almost the same as those of the base section. Images on these sections are clearly viewed and crosstalk is hardly perceivable. This results in acceptable display quality. The base section viewed from a position on a normal to the cell also has quite a satisfactory color.

Even when the viewing angle is changed to a considerable extent, the neutral black and darkness are kept unchanged in the base section and the non-selection section. In a wide viewing angle, the hue is kept unchanged. This leads to good display quality.

Also in the visual evaluation, it has been confirmed that high display quality is obtained by the pixels of the liquid crystal display of embodiment 1.

Description has been given of examples of a simple liquid crystal display of twist nematic type. However, the present invention is naturally applicable to a color, twist-nematic liquid crystal display including a color filter, a liquid crystal display of thin-film transistor (TFT) type, a liquid crystal display of metal-insulator-metal (MIM) type, and the like.

In the description, the twist angle is 90° in the twist-nematic liquid crystal display. The present invention is not restricted by the examples. Concretely, the present invention is applicable to twist-nematic crystal displays having a twist angle ranging from 60° to 120°.

The polarizing plates are installed in the parallel Nicols state in the description. However, even when the angle between the polarizing plates is about 30°, a similar advantage can be obtained.

In the description, the transmission axes of respective polarizing plates is parallel to (the long axis of) liquid crystal molecules. Even when the axes have an angle of 30° therebetween, the present invention is efficiently applicable.

However, when the polarizing plates are arranged in the parallel Nicols state for twist of 90° and the transmission axes of the polarizing plates are parallel to the direction of alignment of liquid crystal on either one of the glass substrates, the transmittivity becomes lower for the base section and the non-selected section, neutral black can be obtained for these section, and the contrast ratio takes a highest value.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A twist-nematic liquid crystal display comprising:
    a first substrate and a second substrate disposed to oppose to said first substrate with a distance d1 therebetween, one of said first and second substrates being a transparent substrate;

a plurality of pixel electrodes formed on one of a surface of said first substrate and a surface of said second substrate, said surfaces being opposed to each other;

a common electrode formed on the other one of said surface of said first substrate and said surface of said second substrate;

voltage applying means for applying a voltage between said pixel electrodes and said common electrode;

twist-nematic liquid crystal sandwiched between said first and second substrates, molecules of said liquid crystal respectively having long axes continuously twisted between said first and second substrates; and a first area in which said pixel electrodes are formed, and a second area in which only said common electrode is formed, said second area being in a periphery of said first area;

wherein when said twist-nematic liquid crystal has a birefringence index of $\Delta n$, $$\Delta n \times d_1 > 2 \, \mu m$$

is satisfied, where $d_1$ is expressed in micrometers;

wherein a contrast obtained according to a transmittivity of light through said first area and a transmittivity of light through said second area is used to display an image;

wherein a discrepancy between the transmittivity of light through said first area when a selection voltage is applied to said pixel electrodes by said voltage applying means and the transmittivity of light through said first area when a non-selection voltage is applied to said pixel electrodes by said voltage applying means is used to display the image; and wherein the non-selection voltage is selected to substantially equalize the transmittivity of light through said first area when the non-selection voltage is applied to said pixel electrodes with the transmittivity of light through said second area.

2. A twist-nematic liquid crystal display comprising:

a first substrate and a second substrate disposed to oppose to said first substrate with a distance d2 therebetween, one of said first and second substrates being a transparent substrate;

a plurality of pixel electrodes formed on one of a surface of said first substrate and a surface of said second substrate, said surfaces being opposed to each other;

a common electrode formed on the other one of said surface of said first substrate and said surface of said second substrate;

voltage applying means for applying a voltage between said pixel electrodes and said common electrode;

twist-nematic liquid crystal sandwiched between said first and second substrates, molecules of said liquid crystal respectively having long axes continuously twisted between said first and second substrates; and a first area in which said pixel electrodes are formed; and a second area in which only said common electrode is formed, said second area being in a periphery of said first area;

wherein when said twist-nematic liquid crystal has a birefringence index of $\Delta n$, $$\Delta n \times d_2 > 2.2 \, \mu m$$

is satisfied, where $d_2$ is expressed in micrometers;

wherein a contrast obtained according to a transmittivity of light through said first area and a transmittivity of light through said second area is used to display an image;

wherein a discrepancy between the transmittivity of light through said first area when a selection voltage is applied to said pixel electrodes by said voltage applying means and the transmittivity of light through said first area when a non-selection voltage is applied to said pixel electrodes by said voltage applying means is used to display the image; and wherein the non-selection voltage is selected to substantially equalize the transmittivity of light through said first area when the non-selection voltage is applied to said ok pixel electrodes to the transmittivity of light through said second area.

* * * * *